US011403179B1

United States Patent
Jain et al.

(10) Patent No.: US 11,403,179 B1
(45) Date of Patent: Aug. 2, 2022

(54) TRANSACTIONALLY CONSISTENT POINT-IN-TIME RESTORE

(71) Applicant: Amazon Technologies, Inc., Seattle, WA (US)

(72) Inventors: Rishabh Jain, Seattle, WA (US); Vaibhav Jain, Seattle, WA (US); Alexander Richard Keyes, Seattle, WA (US); Akshat Vig, Seattle, WA (US); Somasundaram Perianayagam, Seattle, WA (US); Stefano Stefani, Issaquah, WA (US); Tony Petrossian, Bellevue, WA (US); James Christopher Sorenson, Seattle, WA (US); Amit Gupta, Redmond, WA (US); Nathan Pellegrom Riley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 115 days.

(21) Appl. No.: 16/219,343

(22) Filed: Dec. 13, 2018

(51) Int. Cl.
*G06F 16/30* (2019.01)
*G06F 11/14* (2006.01)
*G06F 16/27* (2019.01)

(52) U.S. Cl.
CPC ...... *G06F 11/1451* (2013.01); *G06F 11/1471* (2013.01); *G06F 11/1474* (2013.01); *G06F 16/27* (2019.01)

(58) Field of Classification Search
CPC .. G06F 11/1451; G06F 16/27; G06F 11/1471; G06F 11/1474
See application file for complete search history.

(56) References Cited

U.S. PATENT DOCUMENTS

| | | | | | |
|---|---|---|---|---|---|
| 4,445,171 | A | * | 4/1984 | Neches | G06F 15/161 710/104 |
| 5,452,445 | A | * | 9/1995 | Hallmark | G06F 16/2379 |
| 7,305,421 | B2 | * | 12/2007 | Cha | G06F 11/2094 |
| 7,653,668 | B1 | * | 1/2010 | Shelat | G06F 16/184 707/610 |
| 9,632,878 | B1 | * | 4/2017 | Maccanti | G06F 11/2094 |
| 2010/0106753 | A1 | * | 4/2010 | Prabhakaran | G06F 3/065 707/E17.001 |

(Continued)

OTHER PUBLICATIONS

Saraswat, System Change Number (SCN) Nov. 1, 2014, wordpress. com, https://saruamit4.wordpress.com/2014/11/01/system-change-number-scn/.*

(Continued)

*Primary Examiner* — Mahesh H Dwivedi
(74) *Attorney, Agent, or Firm* — Davis Wright Tremaine LLP (57) ABSTRACT

A distributed database maintains a table on a first plurality of partitions. A request to restore the table to a point-in-time is received. The database determines, based on log data of the partitions, a maximum version number of an operation processed by the partitions. The log data is processed to exclude, from the restoration, operations whose transactions were started after the point-in-time, by setting the version number of those operations to be greater than the maximum version number. The log data is then applied to a second plurality of partitions, where the version number of each applied operation is less than or equal to the determined maximum version number.

20 Claims, 7 Drawing Sheets

(56) References Cited

U.S. PATENT DOCUMENTS

| | | | |
|---|---|---|---|
| 2014/0279920 A1* | 9/2014 | Madhavarapu | G06F 16/2365 |
| | | | 707/649 |
| 2014/0310245 A1* | 10/2014 | Novick | G06F 16/27 |
| | | | 707/645 |
| 2017/0351585 A1* | 12/2017 | Bourbonnais | G06F 16/27 |
| 2019/0310922 A1* | 10/2019 | Cheng | G06F 11/1469 |

OTHER PUBLICATIONS

Lamport, Time, Clocks, and the Ordering of Events in a Distributed System 1978, ACM Operating Systems, vol. 21 No. 7, pp. 558-565.*

Kshemkalyani et al., Distributed Computing: Principles, Algorithms, and Systems 2008, Cambridge University Press, https://www.cs.uic.edu/~ajayk/Chapter3.pdf.*

Steven Van Dorpe, Understanding Lamport Timestamps with Python's multiprocessing library 2018, towards data science, https://towardsdatascience.com/understanding-lamport-timestamps-with-pythons-multiprocessing-library-12a6427881c6.*

Lamport, Time, Clocks, and the Ordering of Events in a Distributed System 1978) Communications of the ACM, Iss 21 vol. 7, pp. 558-565.*

Screen capture of "Computing Device" date unknown [Captured byarchive.org on Oct. 2015], PC Magazine, https://web.archive.org/web/20151004044810/http://www.pcmag.com/encyclopedia/term/66551/computing-device.*

* cited by examiner

TRANSACTIONALLY CONSISTENT POINT-IN-TIME RESTORE

BACKGROUND

There are a number of circumstances in which it is useful for a database management system to restore a copy of a table. For example, if an instance of the database management system were to fail, it might be desired to restore a copy of a table from the failed instance to a new instance. It might also be useful to create a copy on which testing might be performed, or to create a copy of a table to use for analytical purposes. Regardless of the reason, restoring database table may present a variety of challenges, particularly in distributed databases and when a database table is partitioned between computing nodes.

BRIEF DESCRIPTION OF THE DRAWINGS

Various techniques will be described with reference to the drawings, in which.

DETAILED DESCRIPTION

Described herein are techniques for performing a point-in-time restoration of a partitioned database table while maintain atomicity and serializability. A point-in-time restoration of a database table involves reproducing the state of the database table as it existed as of the point-in-time. To maintain atomicity, the techniques described herein may be used to ensure that the restored table includes either all writes related to a transaction, or no writes related to the transaction. To maintain serializability, the techniques described herein may be used to ensure that if writes of a first transaction are included in the restored table, writes of a second transaction are also included in the restored table when the first transaction is dependent on the second transaction.

In an example, a request to restore a partitioned database table is received by a distributed database system. The request comprises information indicating a point-in-time. The request may therefore be described as a request to restore a table $T_1$ to a second table $T_2$, such that the state of the table $T_2$ is equivalent to that of the table $T_1$ at a restore time $R_1$.

The distributed database system determines, based on log data derived from the partitions, a maximum version number of an operation processed by any of the partitions up to the time $T_1$. This version number, which may be designated as $VN_{restore}$, is used to select operations to include in the restored table $T_2$, such that atomicity and serializability are preserved.

The distributed database system adjusts the assignment of version numbers to new transactions, so that operations associated with transactions started after the point-in-time restoration has been requested are assigned version numbers greater than the $VN_{restore}$. This helps to limit the set of transactions to consider for inclusion in the restored table $T_2$.

The distributed database system applies certain of the operations represented by the log data to the restored table $T_2$. The applied operations are those which, after the adjustment, have corresponding version numbers less than or equal to the $VN_{restore}$, and in some cases and embodiments, operations that were not assigned version numbers. After these are applied to the respective partitions, the restored table $T_2$ includes all transactions committed prior to the restore time $R_1$. Moreover, for a given transaction $TXN_1$ included in the restored table $T_2$, all operations of $TXN_1$ are included, and all transactions on which $TXN_1$ depends are included.

The distributed database operates in a manner which supports the restoration process just described, including how it maintains the table $T_1$ prior to the restoration. In general terms, the distributed database supports the restoration process by generating and assigning version numbers in a manner which preserves certain conditions, sometimes described as invariants, or transaction ordering variants, on which the restoration process depends.

For example, the distributed database includes elements which generate and distribute periodically incrementing version numbers. The distributed database may, for example, include a central authority which generates a new, incremented version number once per second, and which provides the new version number to a fleet of transaction coordinators.

Moreover, a given transaction coordinators may receive, from the partitions of the table $T_1$, a $VN_{part-max}$ values indicative of the highest version number of a transaction committed by the respective partition. The partition can then determine a value, designated as $VN_{prepare}$, which is the greater of the $VN_{part-max}$ and $VN_{tc-prepare}$ values. The transaction coordinator assigns the $VN_{tc-prepare}$ value as the version number for prepare operations, and ensures that subsequent commits have version numbers greater than or to the $VN_{prepare}$ value returned from the partition. The transaction coordinator may receive multiple such values from the various partitions. The transaction coordinator can then use the same $VN_{commit}$ in commit request to all of the partitions involved in a transaction. The $VN_{commit}$ can be determined as the maximum of the $VN_{prepare}$ values returned by each of the partitions. Doing so preserves partial ordering of prepare and corresponding commit operations across all of the partitions in the fleet. Note that the partitions, in various embodiments, persist their respective $VN_{prepare}$ values, e.g., by storing their respective $VN_{prepare}$ values in a log file.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. Embodiments may use the techniques described herein to implement a point-in-time restoration capability for a partitioned table, in which a restored table conforms to the atomicity and serializability characteristics. Embodiment may also do so with improved efficiency over other techniques, such as those which involve building dependency graphs.

Figure 1:
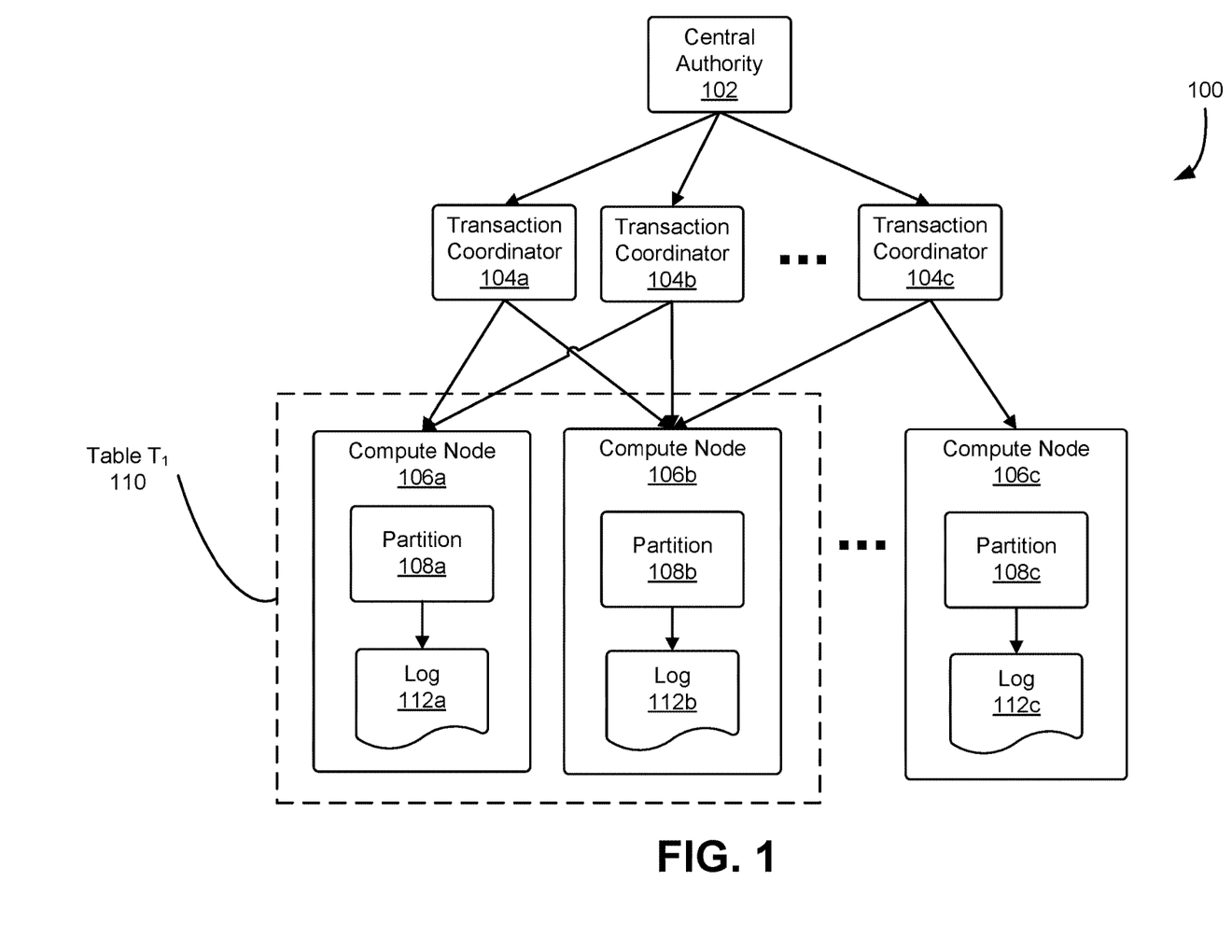
FIG. 1 illustrates an example of a distributed database, in accordance with an embodiment.

FIG. 1 illustrates an example of a distributed database, in accordance with an embodiment. A distributed database 100, in various embodiments as described herein, comprises a variety of components or modules which collectively perform the functions of the distributed database 100. The functions include storing and retrieving data.

In an embodiment, the distributed database 100 is a key-value database. A key-value database, which may include database systems sometimes referred to as "NoSQL" databases, includes data storage and retrieval systems which store data in key-value pairs, or as collections of data paired with corresponding keys.

In an embodiment, the distributed database 100 stores data as collections of key-value pairs. A collection of data may also be referred to herein as a table, or vice versa. In some embodiments, a collection or table may in conform to a schema, while in other embodiments the collection may be unstructured and therefore not required to conform to any particular schema. In other instances, the table collection may be semi-structured, e.g., required to conform to various constrains other than a rigid schema.

In an embodiment, the distributed database is a relational database. A relational database refers to a database that supports storing data as a number of related tables. Typically, the tables of a relational database are structured to confirm to a schema which constrains the data in each table to a defined row-and-column format.

In an embodiment, the distributed database is any of a variety databases that support the storage and retrieval of records based on put and get operations based on keys.

A module, as used herein, refers to processor-executable instructions for performing various functions attributed herein to the particular module, and to a memory device onto which at least some of the processor-executable instructions have been loaded. The instructions, when executed, cause a system comprising the module to perform the attributed functions. In some cases, a module may comprise additional hardware components, such as specialized processors, programmable controllers, and so forth. It will be appreciated that, in certain cases and embodiments, functions attributed to a module may be performed by combinations of such hardware components and processor-executable instructions.

The distributed database 100 comprises a plurality of partitions 108a-c. In the example of FIG. 1, the distributed database 100 stores data for a table, which for descriptive purposes may be referred to herein as table $T_1$ 110. The distributed database 100 stores table $T_1$ 110 as a partitioned table. A partition, as used herein, refers to a subdivision of a table or collection. For example, a table or collection might be horizontally partitioned, so that a first subset of rows or key-value pairs of table $T_1$ 110 is stored on a first partition 108a, and a second subset of the table $T_1$ 110 is stored on a second partition 108b.

A partition 108 may be stored on and maintained by a compute node 106. For example, in FIG. 1, a first partition 108a is stored on a first compute node 106a, a second partition 108b is stored on a second compute node 106b, and so on. As used herein, a compute node, or computing node, is a computing device such as the application servers 708 depicted in FIG. 7. By increasing the number of compute nodes, the distributed database 100 may be configured to be capable of processing an increased quantity of storage and retrieval operations. Regarding a particular table, such as the depicted table $T_1$, the distributed database 100 may be configured to be capable of processing an increased quantity of storage and retrieval operations directed to or otherwise involving the table, by further partitioning the table among an increased number of compute nodes.

As used herein the term partition may sometimes be used to refer to an operation performed by the computing node on which the partition is stored. For example, an operation performed by a first compute node 106a might be described as being performed by partition 108a. It will be appreciated that, when the term partition is used in this sense, it is to improve the clarity of the description. Whether the term partition is used in this sense will be clear from the context in which the term is used.

The distributed database 100 may also comprise a number of transaction coordinators 104a-c. A transaction coordinator, such as any of the depicted transaction coordinators 104a-c, is a module that performs functions which may include receiving a request to initiate a transaction, receiving a request to perform an operation in the context of the initiated transaction, and receiving a request to commit the transaction. A transaction coordinator may further perform functions to cause the requested transaction to be initiated, the requested operations to be performed, and the performed operations to be committed.

Among the functions performed by the transaction coordinators are functions to maintain version numbers of transactions. The functions may further include communication with the partitions 108a-c regarding the version numbers to associate with new and ongoing transactions. These functions will be described in more detail below.

The transaction coordinators 104a-c may each be hosted on a compute node. Additional transaction coordinators may be added in order to facilitate scaling of the system's capacity. Although depicted as separate elements in FIG. 1, in various embodiments the transaction coordinators 104a-c may be co-located with other modules, such as those located on the compute nodes 106a-c on which the partitions 108a-c are maintained.

The distributed database 100 may further comprise a central authority 102. The central authority 102, in an embodiment, maintains a global version number which increments at least once per a configured or pre-determined time period. For example, the central authority 102 might increment a global version number once per second, and communicate the incrementing of the version number to each of the transaction coordinators.

The central authority, in an embodiment, is a module residing on a compute node. In some instances, the compute node on which the central authority resides may be one of the compute nodes 106 that host partitions 108. In other instances, another compute node might be used. It may be the case that at a given time, any one of the compute nodes that comprise the distributed database 100 might be designated as the central authority 102. This role might, in various cases and embodiments, be moved between compute nodes at various times.

The global version numbers, in various embodiments, are made durable. Here, durability of the version numbers refers to the system taking steps to ensure that new global version numbers, once generated, are not lost in the event of system failure. In embodiments, global version numbers may be replicated. Replication of the global version numbers may include storing copies of the global version numbers in a plurality of locations. Replication of the global version numbers may promote durability, and may also promote scaling of the system depicted in FIG. 1. In an embodiment, the central authority 102 comprises a plurality of computing devices, among which generated global version numbers are replicated.

Figure 2:
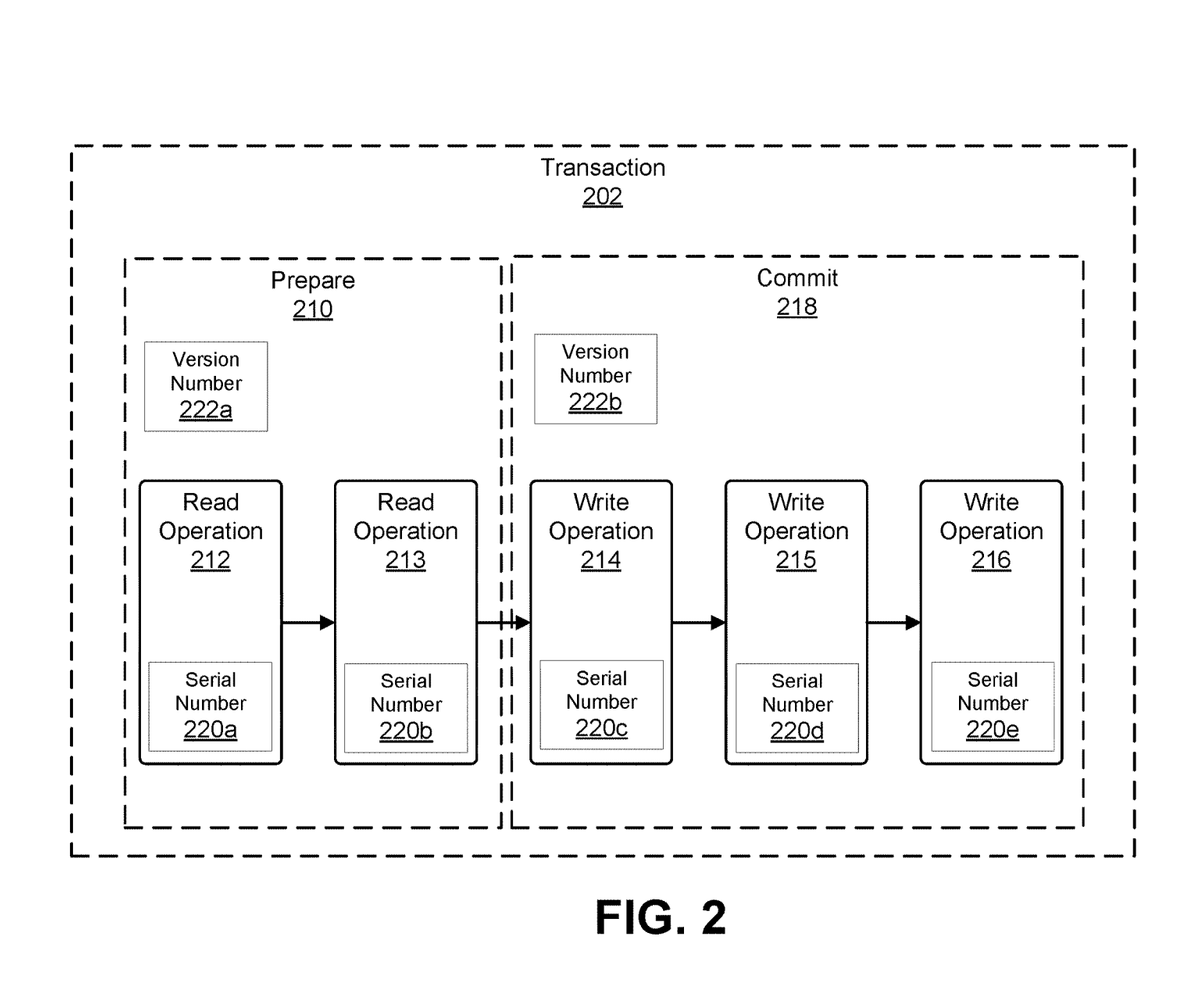
FIG. 2 illustrates an example of transactions and operations, in accordance with an embodiment.

FIG. 2 illustrates an example of transactions and operations, in accordance with an embodiment. In general, a transaction refers to one or more operations which are treated by a database system as an indivisible, or atomic, unit of work. For example, as illustrated by the example 200 of FIG. 2, a transaction 202 can comprise various operations 212-216 which begin with a prepare operation 210 and end with a commit operation 218.

A prepare operation 210 may sometimes be referred to as a begin transaction operation, or described with other, similar, terminology. It is associated with the initiation of the transaction 202, and may comprise operations to read data and to determine whether and how data should change. A commit operation 218, on the other hand, applies the determined operations and finalizes the writes in the database.

The prepare operation 210 may comprise one or more read operation(s) 212, 213. The prepare operation 210 may further include other actions preparatory to altering the state of the database, such as computing, but not committing, write operations. A read operation 212, 213 retrieves data from the database, and a write operation 214-216 modifies data in the database, for example by inserting, updating, or deleting an item, or inserting, updating, or deleting a combination of items.

In the example of FIG. 2, the transaction 202 is completed by a commit operation 218. The commit operation indicates that the changes to data indicated by the write operations 214-216 should be finalized in the database. Note that the transaction may not necessarily end in a commit. The transaction 202 could, for example, be explicitly terminated with a cancel or rollback operation, which would indicate to the database that none of the write operations 214-216 should be finalized, and that any changes made by the write operations 214-216 should be reverted. The transaction 202 might also be left in a pending state, until a timeout occurs and the transaction is rolled back.

The operations of the transaction 202 may be recorded in a log file or other file or data repository. For example, in an embodiment, each partition of a table generates and stores log records corresponding to the operations 210-218. Examples of log files are depicted in FIG. 1.

In a log file, the order of the operations may be indicated by a serial number 220a-e associated with each operation 212-216. The serial numbers may indicate order with respect to a particular transaction, or may be indicative of a local or global ordering. In some embodiments, serial numbers are associated with the prepare 210 and commit 218 operations, in addition to or instead of with the read operations 212, 213 and write operations 214, 216.

The prepare 210 operation may be associated with a version number 222a, and the commit 218 operation may be associated with another version number 222b. The two version numbers may be equivalent, in some cases and embodiments. As explained herein, the version numbers are managed such that the version number 222a of the prepare operation 210 is always less than or equal to the version number 222b of the corresponding commit operation 218. In some embodiments, the read operations 212, 213 and write operations 214-216 are also associated with version numbers according to the same constraint.

Figure 3:
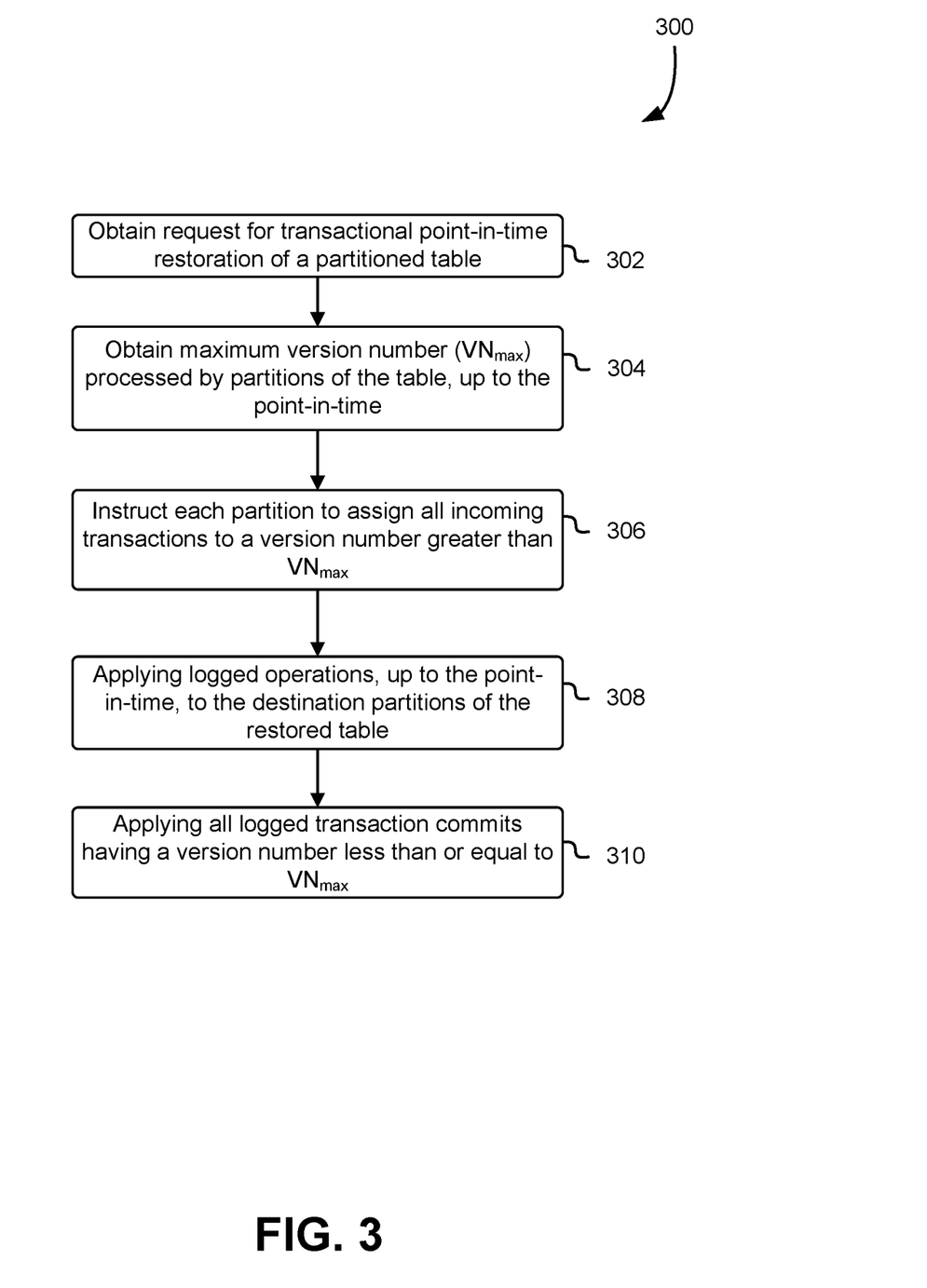
FIG. 3 is a flow diagram depicting aspects of performing a transactionally consistent point-in-time restoration of a partitioned database table, in accordance with an embodiment.

The operation of the distributed database 100 may be understood in view of FIG. 3, which is a flow diagram depicting aspects of a process 300 for performing a transactionally consistent point-in-time restoration of a partitioned database table, in accordance with an embodiment. Although FIG. 3 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

Step 302 depicts receiving a request to perform a transactional point-in-time restoration of a partitioned database table, such as the table $T_1$ 110. It will be appreciated that a point-in-time restoration may, in cases and embodiments, involve more than one table. For illustrative purposes, FIG. 3 refers to the single-table case. The request may be received, or otherwise obtained, from a client of the distributed database 100, from an administrative agent, from a diagnostic module of the distributed database 100, or elsewhere. Here, receiving or obtaining the request refers to receiving a signal, such as an electronic message delivered over a network, which comprises data indicating that such as restoration should be performed. The signal may, for example, be received by a network interface card, or via the invocation of an application programming interface. The request may comprise a timestamp or other value indicative of a point-in-time.

Step 304 depicts a transaction coordinator obtaining a maximum version number of a transaction processed by partitions of the table, up to the point-in-time of the restore. This may, include transactions that have completed and transactions that are pending. For example, with reference to FIG. 1, a transaction coordinator 104a obtains the maximum version number of any transaction processed by partition 108a and partition 108b, the two partitions which make up the table $T_1$ 110. The maximum version number, which may be designated as $VN_{max}$, can be determined by receiving, from each partition, the highest version number for a transaction processed by that partition. $VN_{max}$ can then be set to the highest version number received from any of the partitions. For example, if partition 108a return a $VN_{local-max}$ of 100, and partition 108b returned a $VN_{local-max}$ of 200, then $VN_{max}$ can be set to 200.

Step 306 depicts the transaction coordinator 104a instructing each partition to assign new transactions a version number that is greater than $VN_{max}$. Here, a new transaction refers to a transaction whose prepare operation occurred after the restoration of the database table was requested.

Step 308 depicts applying logged operations, up to the point-in-time, to the destination partitions of the restored table. For example, regarding FIG. 1, each of the partitions 108a-c stores data in a corresponding log 112a-c. The log 112a of one of the partitions 108a comprises entries describing each operation received by the compute node 106a and, in most cases, applied to the partition 108a. Each of these entries may have be stored with the version number of the transaction that is associated with the operation. During a restoration, these operations are applied to the destination partitions, provided that the version number associated with the operation is less than or equal to the $VN_{max}$.

As used herein, applying an operation refers to storing data in a table or collection of data, or more generally to storing data in a database. Applying an operation, in general, has the effect of altering the state of the table, collection, or database. Regarding a particular item, applying an operation causes the state of the item to change. Embodiments may apply an operation by replacing the data, or image, that represents the data with new data. In some cases, changes to data can be represented as a series of incremental operations on the item. Embodiments may, in some cases, store data representing a prior data state.

Step 310 depicts applying all logged transaction commits having a version number that is less than or equal to the $VN_{max}$. Note that there may be cases in which commits whose version number is less than or equal to the $VN_{max}$ are received after the point-in-time of the restore.

The result of the process depicted by FIG. 3 is a restored database table, comprising the destination partitions, which is transactionally consistent. The restored database table will include all transactions having a version number less than or equal to $VN_{max}$ and no transactions having a version number greater than $VN_{max}$.

Figure 4:
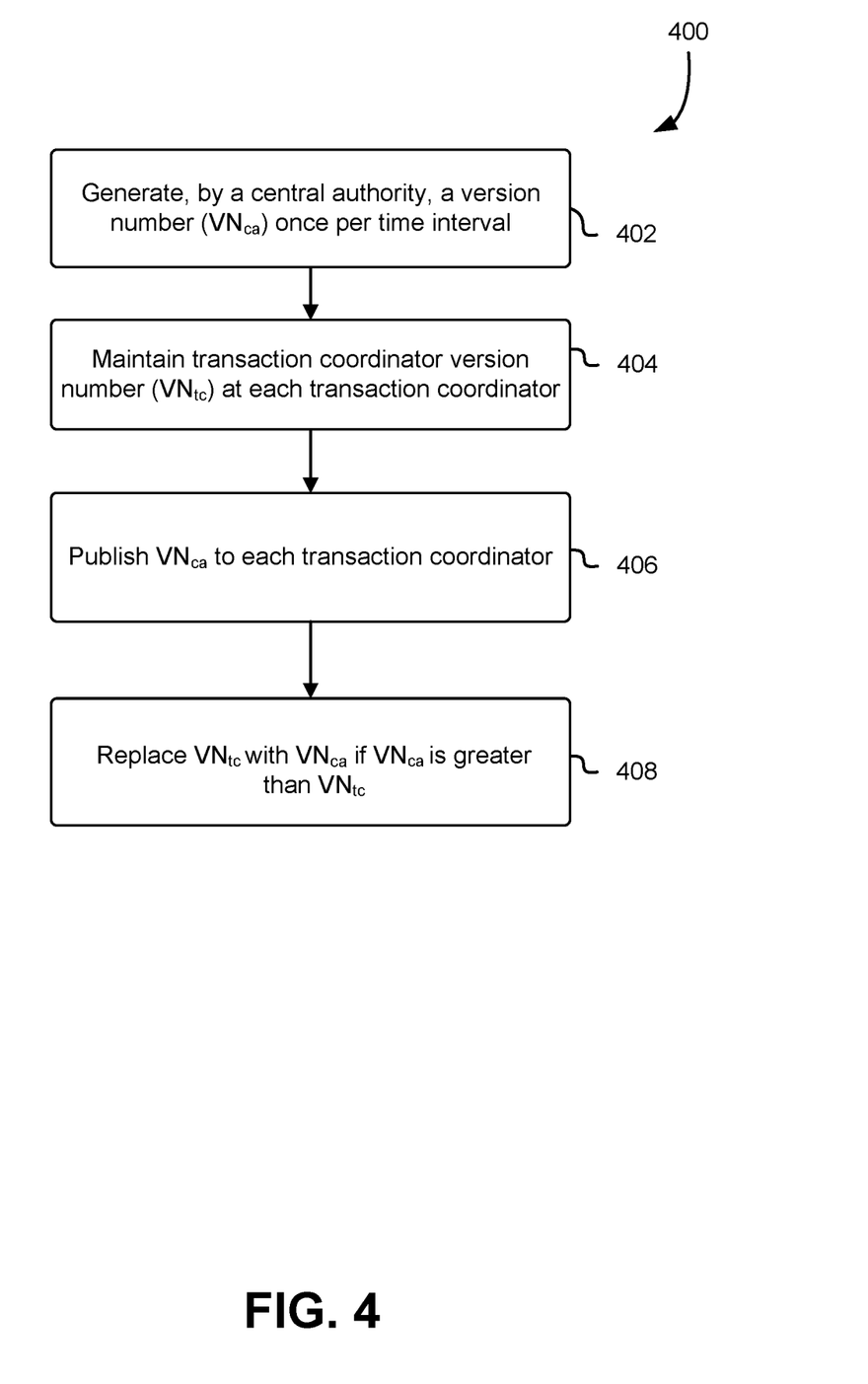
FIG. 4 is a flow diagram depicting aspects of managing version numbering in a distributed database system, in accordance with an embodiment.

Another aspect of the operation of the distributed database 100 is the generation of the version numbers. FIG. 4 is a flow diagram depicting aspects of managing version numbering in a distributed database system, in accordance with an embodiment. Although FIG. 4 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 400 may be performed by components of the distributed database 100, such as the central authority 102 and transaction coordinators 104a-c. In general terms, the example process 400 describes a process by which the central authority 102 generates and distributes version numbers to the transaction coordinators 104a-c.

Step 402 depicts generating, by the central authority, a version number once per time interval. For example, the central authority 102 may generate a new, incremented version number once per second. The rate at which new version numbers is generated may be selected based on factors such as a desired level of granularity for the restoration. A version number generated by the central authority may be described herein as $VN_{ca}$.

Step 404 depicts each transaction coordinator 104a-c maintaining its own copy of the latest version number. For a given transaction coordinator, this version number may be designated as $VN_{tc}$. In some cases and embodiments, a transaction coordinator can independently increment its copy of the latest version number in the event that an updated version number is not received from the central authority 102 within some threshold period of time.

Step 406 depicts the central authority 102 publishing an incremented $VN_{ca}$ to each of the transaction coordinators 104. For example, the central authority 102, upon incrementing $VN_{ca}$, may send an electronic message to each of the transaction coordinators 104. A variety of communications may be used. For example, the central authority 102 may broadcast messages to any listening transaction coordinators 104a-c, or the central authority 102 might establish one-to-one communications channels. These examples should not been seen as limiting the scope of the present disclosure to only those examples provided. The amount granularity of the restore operation may be influenced, in various embodiments, by the propagation delay of these messages. As such, in some embodiments, higher-speed networks may be used. In some embodiments, a gossip protocol is used.

In some embodiments, a time service may be used in place of a central authority, provided that the time service can guarantee that time vended out by it is within some threshold amount of a real absolute time. The use of a time service may mitigate reliance on a central authority, since each transaction coordinator can get its version number from time service running locally. If the time service is able to ensure that the provided time will always be within some threshold of a real absolute time, each transaction coordinator can get its version number from such a time service running locally, rather than from a central authority or fleet wide time service.

Step 408 depicts the transaction coordinators replacing their own $VN_{tc}$ with $VN_{ca}$, if $VN_{ca}$ is greater than $VN_{tc}$. Under normal operating conditions, this causes the $VN_{tc}$ of each transaction coordinator to increment once per time interval.

Each transaction coordinator has its own $VN_{tc}$. The $VN_{tc}$ of a given transaction coordinator may lag behind those of other coordinators. This could result in the lagging transaction coordinator sending a prepare for an operation on an item using a version number that is lower than the version number used for an operation on the same item by an up-to-date transaction coordinator. If the lagging transaction coordinator commits using the lower version number, it would cause a violation of the transaction ordering invariant. However, this invariant may be preserved using the procedure depicted by FIG. 5.

Figure 5:
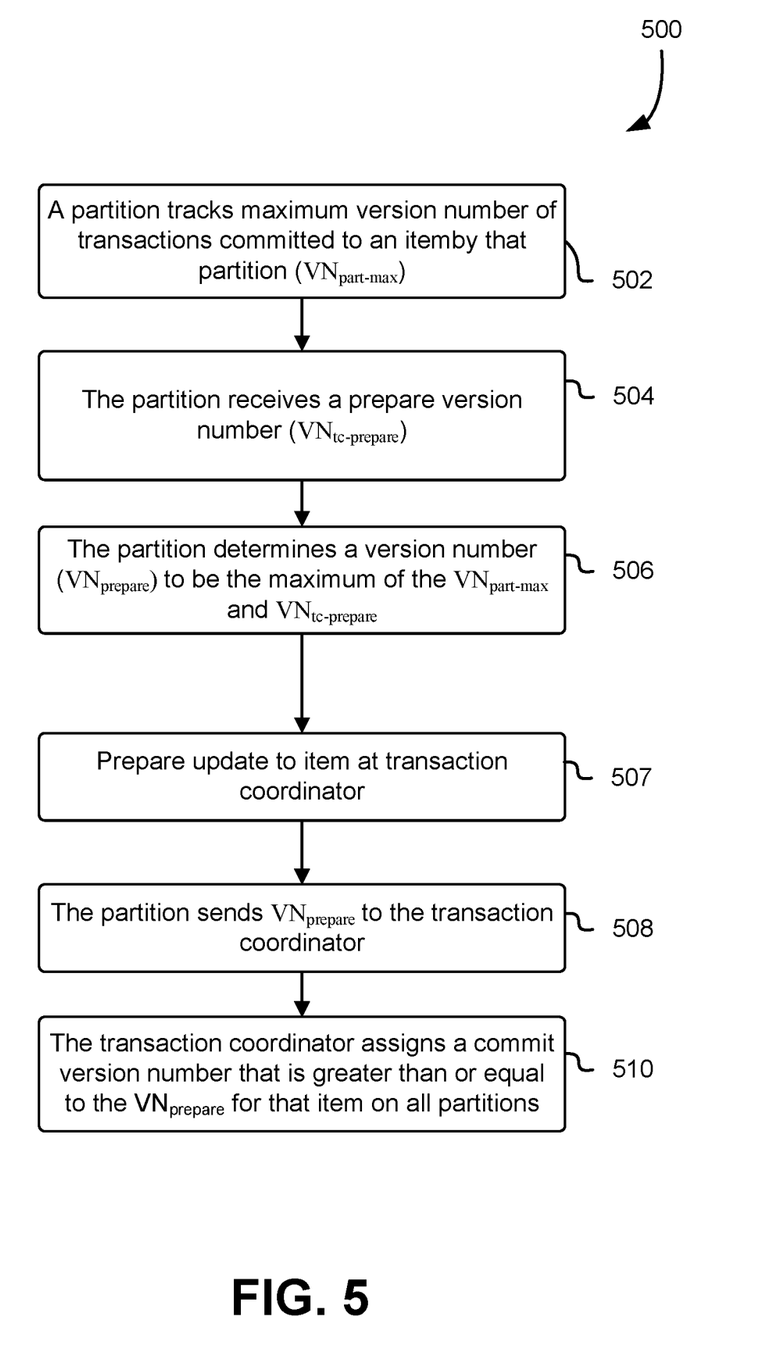
FIG. 5 is a flow diagram depicting aspects of assigning version numbers to prepare and commit operations, in accordance with an embodiment.

FIG. 5 is a flow diagram depicting aspects of assigning version numbers to prepare and commit operations, in accordance with an embodiment. Although FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 500 may be performed by a transaction coordinator and one or more partitions of a distributed database, as indicated below. For example, regarding FIG. 1, the steps of the example process 500 may be performed by the transaction coordinator 104a-c and partitions 108a,b of table $T_1$.

Step 502 depicts that a partition tracks the maximum version number of any transaction committed to an item by the partition. This version number may be designated as $VN_{part-max}$.

Step 504 depicts that the partition receives a version number assigned by the transaction coordinator to a prepare operation. This version number may be designated as $VN_{tc-prepare}$.

Step 506 depicts that the partition determines a version number to use for the prepare operation, by taking the maximum of $VN_{part-max}$ and $VN_{tc-prepare}$. This version number may be designated as $VN_{prepare}$.

Step 507 depicts the transaction coordinator preparing an update to the item.

Step 508 depicts that the partition sends the determined $VN_{prepare}$ to the transaction coordinator.

Step 510 depicts that the transaction coordinator assigns a commit version number to the transaction that is greater than or equal to the $VN_{prepare}$ for the item, determined by the partitions participating in the transaction, with respect to the items and operations that make up the transaction. This preserves the transaction ordering invariants for updates to the item.

As depicted by FIGS. 3-5 and described herein, maintaining a partitioned database table, in various embodiments, comprise comprises assigning version numbers to operations performed on the database table, such that no transaction is dependent on a transaction with a greater version number, and such that no prepare operation has a version number greater than a corresponding commit operation.

Maintaining a partitioned database table, in various embodiments, may further involve a transaction coordinator receiving, from a central authority, an incremented version number once per time period. Moreover, the transaction coordinator assigns the incremented version number to a prepare operation, and sends the prepare operation to one or more of the first plurality of partitions.

Maintaining a partitioned database table, various embodiments, may further involve partitions processing a prepare operation by at least returning, to a transaction coordinator, a largest version number of a transaction committed by the respective partition. The transaction coordinator then assigns a commit operation a version number greater than or equal to the largest version number committed by any of the one or more partitions.

In an embodiment, maintaining the database comprises the transaction coordinator receiving information indicative of a largest version number of a transaction committed by the first plurality of partitions. Maintaining the partitioned database table may further involve the transaction coordinator assigning a commit operation a version number that is greater than or equal to the largest version number.

Figure 6:
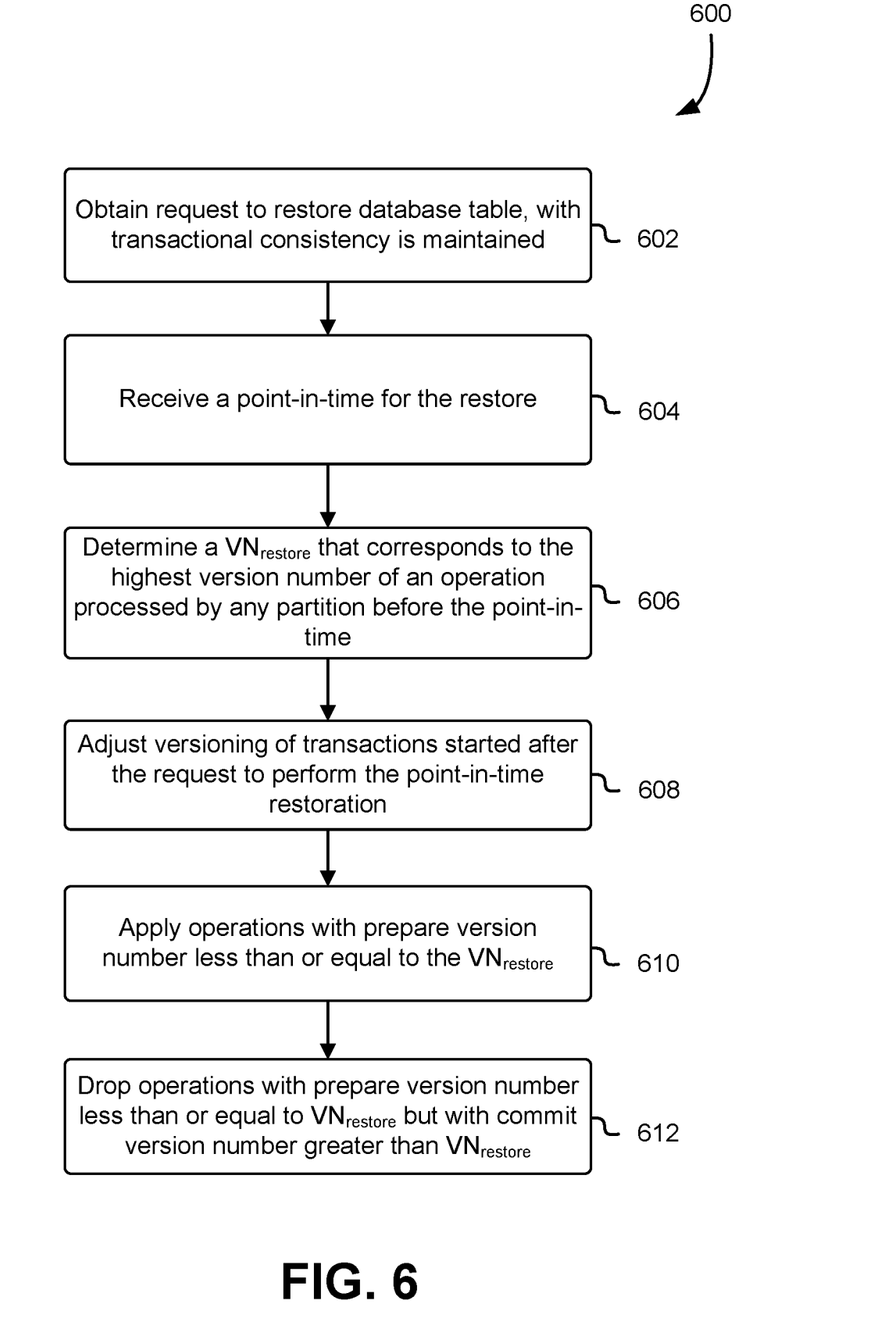
FIG. 6 is a flow diagram depicting further aspects of performing a transactionally consistent point-in-time restoration of a partitioned database table, in accordance with an embodiment.

FIG. 6 is a flow diagram depicting further aspects of performing a transactionally consistent point-in-time restoration of a partitioned database table, in accordance with an embodiment. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 600 may be performed by a distributed database, such as the distributed database 100 depicted in FIG. 1. As explained below, the process may involve actions taken by the transaction coordinator 104a-c and partitions 108a,b of table $T_1$.

Step 602 depicts obtaining a request to restore a database table, with transactional consistency maintained. As explained herein, transactional consistency refers to maintaining the properties of atomicity and serializability with respect to the transactions included in the restored table.

Step 604 depicts receiving a point-in-time for the restore. In some embodiments, a timestamp or other value indicative of a point-in-time is included in the request to restore the database table. However, a time indicated by the request may not correspond exactly to the point-in-time used for the restoration. As depicted by FIG. 3, a central authority generates a new version number once per time interval. For example, the central authority 102 depicted by FIG. 1 might generate a new version number once each second. The point-in-time to use for the requested restoration may be obtained, in some embodiments, by rounding the time indicated by the request to the nearest time interval. Alternatively, the point-in-time might be represented by identifying a serial number that corresponds to the time indicated by the request.

Step 606 depicts determining a value, designated herein as $VN_{restore}$, that corresponds to the highest version number of an operation committed by any partition before the point-in-time. For example, with reference to FIG. 1, the highest version number of an operation processed by the first partition 108a prior to the point-in-time might be determined to be 100. The highest version number of an operation processed by the second partition 108b, prior to the point in time, might be determined to be 120. This determination is made regardless of whether or not the transactions corresponding to these version numbers have been committed. In this example, $VN_{restore}$ would be calculated as 120, based on it being the maximum value returned by any partition.

Embodiments may determine the highest version number in a variety of ways. In an embodiment, log entries for each partition are scanned to identify the highest version number of an operation processed by that partition. The scanning ceases when it reaches entries after the determined point-in-time, or each log entry can store a maximum committed version number seen by that partition.

Step 608 depicts instructing each partition to adjust its versioning of transactions initiated after the request to restore is received, or after initiating a restoration of the database table, so that transactions started after the point-in-time restoration begins have version numbers greater than the $VN_{restore}$. This helps to bound the restoration process to a limited number of transactions.

Step 610 depicts applying, to the restored table, those operations having prepare version numbers that are less than or equal to the $VN_{restore}$. However, as depicted by step 612, operations whose prepare version number is less than or equal to the $VN_{restore}$, but with a commit version number greater than $VN_{restore}$, are excluded. Collectively, steps 610 and 612 therefore show applying the operations of transactions that have a commit version number less than or equal to $VN_{restore}$. Note that, in some embodiments, some operations may not be assigned version numbers. These may be applied in order, based for example on their order in a transaction log or based on a serial number or other information. Accordingly, all transactions, up to the indicated point in time, are restored.

Restoring a partitioned database table comprises, in various embodiments, receiving a request to perform a transactionally consistent point-in-time restoration of the database table. The request may be received by the distributed database, a transaction coordinator, central authority, or other module.

Restoring the partitioned database table further comprises, in various embodiments, determining, based on log data of the first plurality of partitions, a maximum version number of an operation processed by any of the first plurality of partitions up to the point-in-time.

Restoring the partitioned database table further comprises, in various embodiments, adjusting the log data by changing a version number of an operation associated with a transaction started after the point-in-time, the version number changed to be greater than the maximum version number.

Restoring the partitioned database table further comprises, in various embodiments, applying, to a second plurality of partitions, operations indicated by the log data, wherein each applied operations is associated with a commit operation having a version number less than or equal to the maximum version number.

The restored database table, in accordance with the techniques described herein, in transactionally consistent. In an embodiment, transactional consistency because all writes associated with a first transaction committed to the first plurality of partitions are applied to the restored database table; and because all writes associated with a second transaction are applied to the restored database table when the first transaction is dependent on the second transaction. Accordingly, atomicity and serializability are preserved in the restored database table. Atomicity comprises all writes associated with a first transaction and committed to the first plurality of partitions being applied to the restored database table. Serializability comprises all writes associated with a second transaction being applied to the restored database table when the first transaction is dependent on the second transaction.

Figure 7:
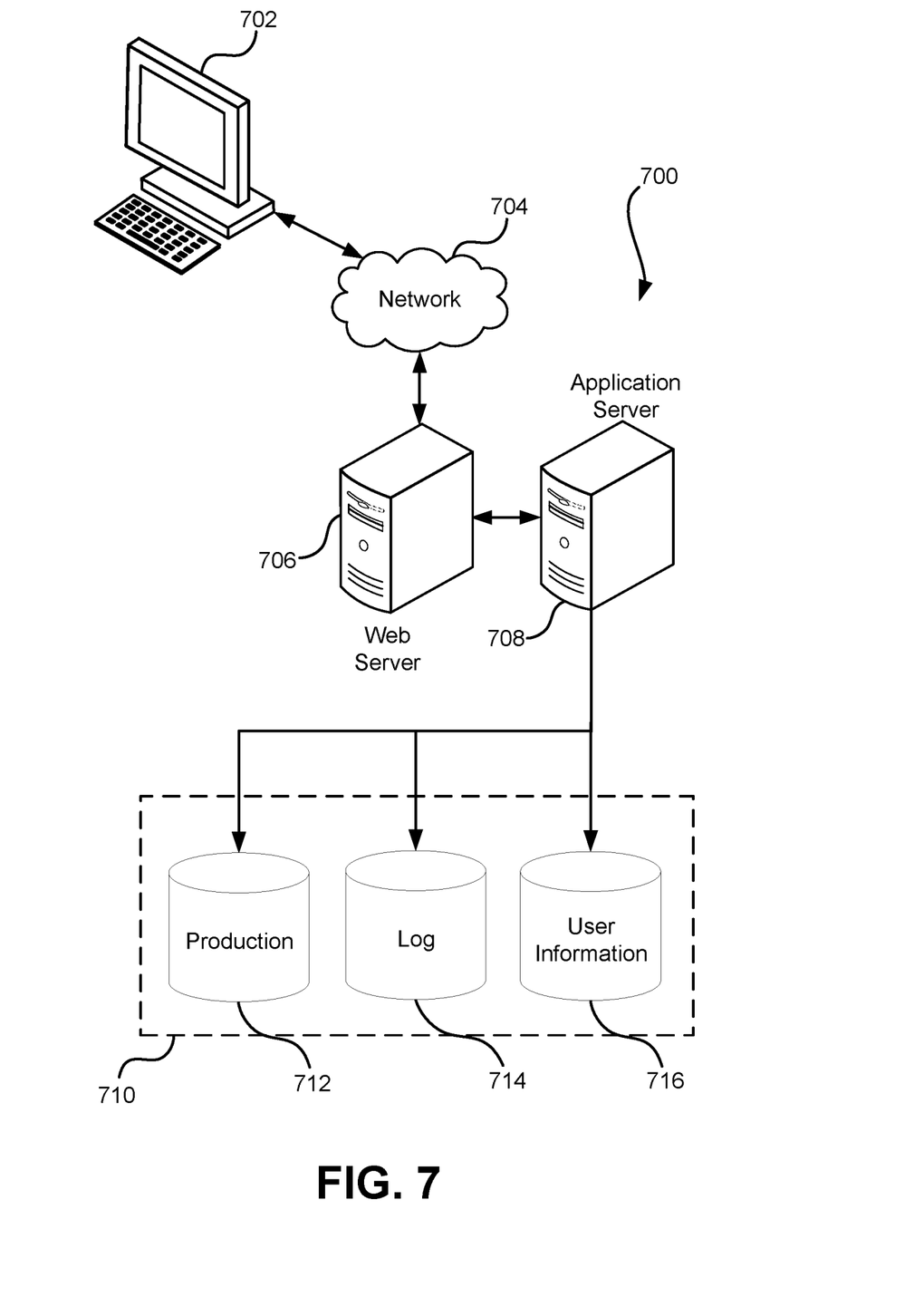
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702.

Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as My SQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   memory that stores computer-executable instructions configured, in response to execution by the at least one processor to cause the system to:
   maintain a database table comprising a first plurality of partitions stored on a corresponding plurality of compute nodes, wherein maintaining the database table comprises assigning version numbers to operations performed on the database table, wherein no transaction is dependent on a transaction with a greater version number, and wherein no prepare operation has a version number greater than a corresponding commit operation;
   receive a request to perform a transactionally consistent point-in-time restoration of the database table;
   determine, based on log data of all partitions of the first plurality of partitions, a maximum version number of an operation processed among all of the first plurality of partitions up to the point-in-time;
   in response to the request, cause version numbers of operations of transactions started after receipt of the request to be greater than the maximum version number; and
   apply, to a second plurality of partitions, operations indicated by the log data, wherein each applied operation is associated with a commit operation having a version number less than or equal to the maximum version number, wherein the second plurality of partitions are different from the first plurality of partitions.

2. The system of claim 1, wherein:
   all writes associated with a first transaction committed to the first plurality of partitions are applied to the restored database table; and
   all writes associated with a second transaction are applied to the restored database table when the first transaction is dependent on the second transaction.

3. The system of claim 1, wherein:
   a transaction coordinator receives, from a central authority, an incremented version number once per time period;
   the transaction coordinator assigns the incremented version number to a prepare operation; and
   the transaction coordinator sends the prepare operation to one or more of the first plurality of partitions.

4. The system of claim 1, wherein:
   one or more partitions of the first plurality of partitions processes a prepare operation by at least returning, to a transaction coordinator, a largest version number of a transaction committed by the respective partition; and
   the transaction coordinator assigns a commit operation a version number greater than or equal to the largest version number committed by any of the one or more partitions.

5. The system of claim 1, wherein the log data comprises a plurality of log files, each of the plurality of log files corresponding to a partition.

6. A computer-implemented method, comprising:
   maintaining a database table on a first plurality of partitions stored on a corresponding plurality of compute nodes; and
   restoring the database table by at least:
   determining, based on log data of the first plurality of partitions, a maximum version number of any operation processed by all of the first plurality of partitions up to a point-in-time of a restoration request;
   assigning, in response to the restoration request, to all operations of transactions started after beginning to restore the database table, version numbers greater than the maximum version number; and
   applying, to a second plurality of partitions different than the first plurality of partitions, operations indicated by the log data, wherein each of the applied operations is associated with a commit operation having a version number less than or equal to the maximum version number.

7. The computer-implemented method of claim 6, wherein atomicity and serializability are preserved in the restored database table.

8. The computer-implemented method of claim 7, wherein:
all writes associated with a first transaction and committed to the first plurality of partitions are applied to the restored database table; and
all writes associated with a second transaction are applied to the restored database table when the first transaction is dependent on the second transaction.

9. The computer-implemented method of claim 6, wherein maintaining the database table comprises:
sending, from a central authority to a transaction coordinator, an incremented version number once per time period;
assigning, by the transaction coordinator, the incremented version number to a prepare operation; and
sending the prepare operation to one or more of the first plurality of partitions.

10. The computer-implemented method of claim 6, wherein maintaining the database table comprises:
receiving information indicative of a largest version number of a transaction committed by the first plurality of partitions.

11. The computer-implemented method of claim 10, wherein maintaining the database table comprises:
assigning a commit operation a version number that is greater than or equal to the largest version number.

12. The computer-implemented method of claim 6, wherein maintaining the database table comprises assigning version numbers to operations performed on the database table, wherein no transaction is dependent on a transaction with a greater version number, and wherein no prepare operation has a version number greater than a corresponding commit operation.

13. The computer-implemented method of claim 6, wherein maintaining the database table comprises:
storing a value indicative of a current version number;
receiving an incremented global version number;
updating the stored value to the incremented global version number when the incremented version number is greater than stored value; and
assigning a version number to an operation based on the stored value.

14. A non-transitory computer-readable storage medium having stored thereon executable instructions configured, as a result of being executed by one or more processors of a computer system to cause the computer system to at least:
maintain a database table on a first plurality of partitions, each partition maintained on one of a respective plurality of compute nodes;
in response to a request to restore the database table, determine, based on log data of the first plurality of partitions, a maximum version number of an operation processed among all of the first plurality of partitions up to a point-in-time;
in response to the request to restore the database table, change a version number of an operation to be greater than the maximum version number, based on the operation being associated with a transaction started after receipt of the request to restore the database table; and
apply, to a second plurality of partitions, operations indicated by the log data, wherein each of the applied operations is associated with a commit operation having a version number less than or equal to the maximum version number.

15. The non-transitory computer-readable storage medium of claim 14, wherein maintaining the first plurality of partitions comprises incrementing version numbers assigned to operations based at least in part on an interval of time.

16. The non-transitory computer-readable storage medium of claim 14, wherein maintaining the first plurality of partitions comprises assigning an operation a version number that is greater than or equal to a largest version number processed by any of the first plurality of partitions.

17. The non-transitory computer-readable storage medium of claim 14, wherein maintaining the first plurality of partitions comprises assigning a version number to prepare and commit operations sent to any of the first plurality of partitions.

18. The non-transitory computer-readable storage medium of claim 14, wherein applying the operations indicated by the log data to the second plurality of partitions restores the database table.

19. The non-transitory computer-readable storage medium of claim 14, wherein the log data comprises a plurality of log files, each of the plurality of log files corresponding to a partition.

20. The non-transitory computer-readable storage medium of claim 14, wherein the executable instructions further comprise executable instructions that, as a result of being executed by the one or more processors, cause the computer system to:
store a value indicative of a current version number to assign to operations;
receive an incremented version number;
update the stored value to the incremented version number when the incremented version number is greater than the stored value; and
assign a version number to an operation based at least in part on the stored value.

* * * * *